Figure 6:
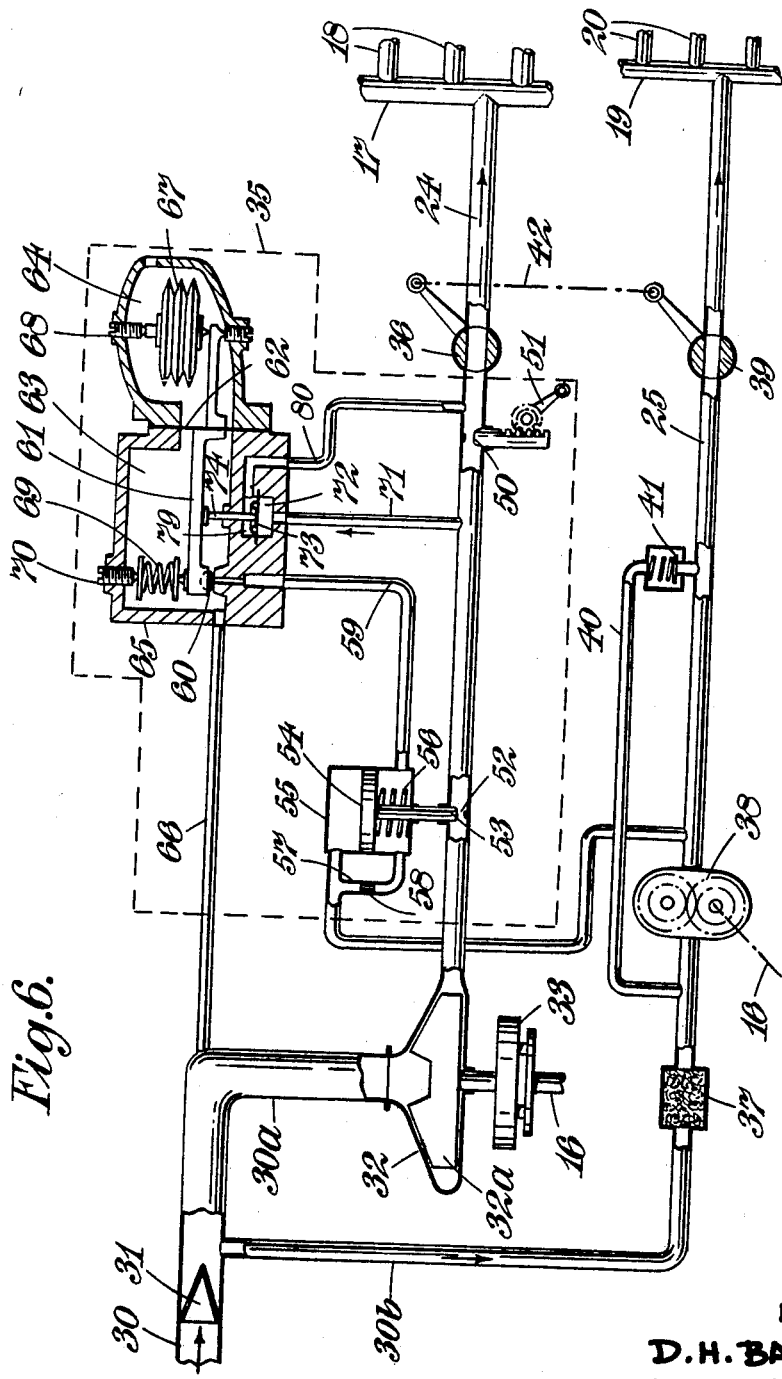

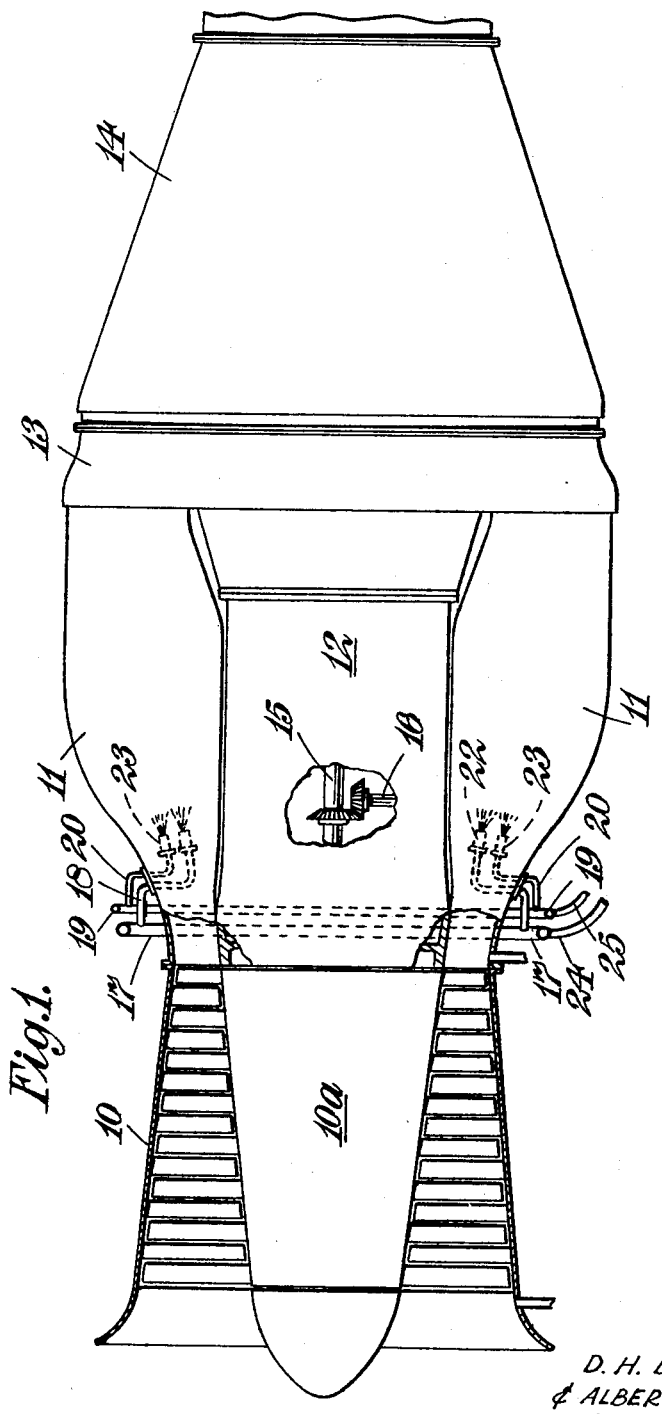

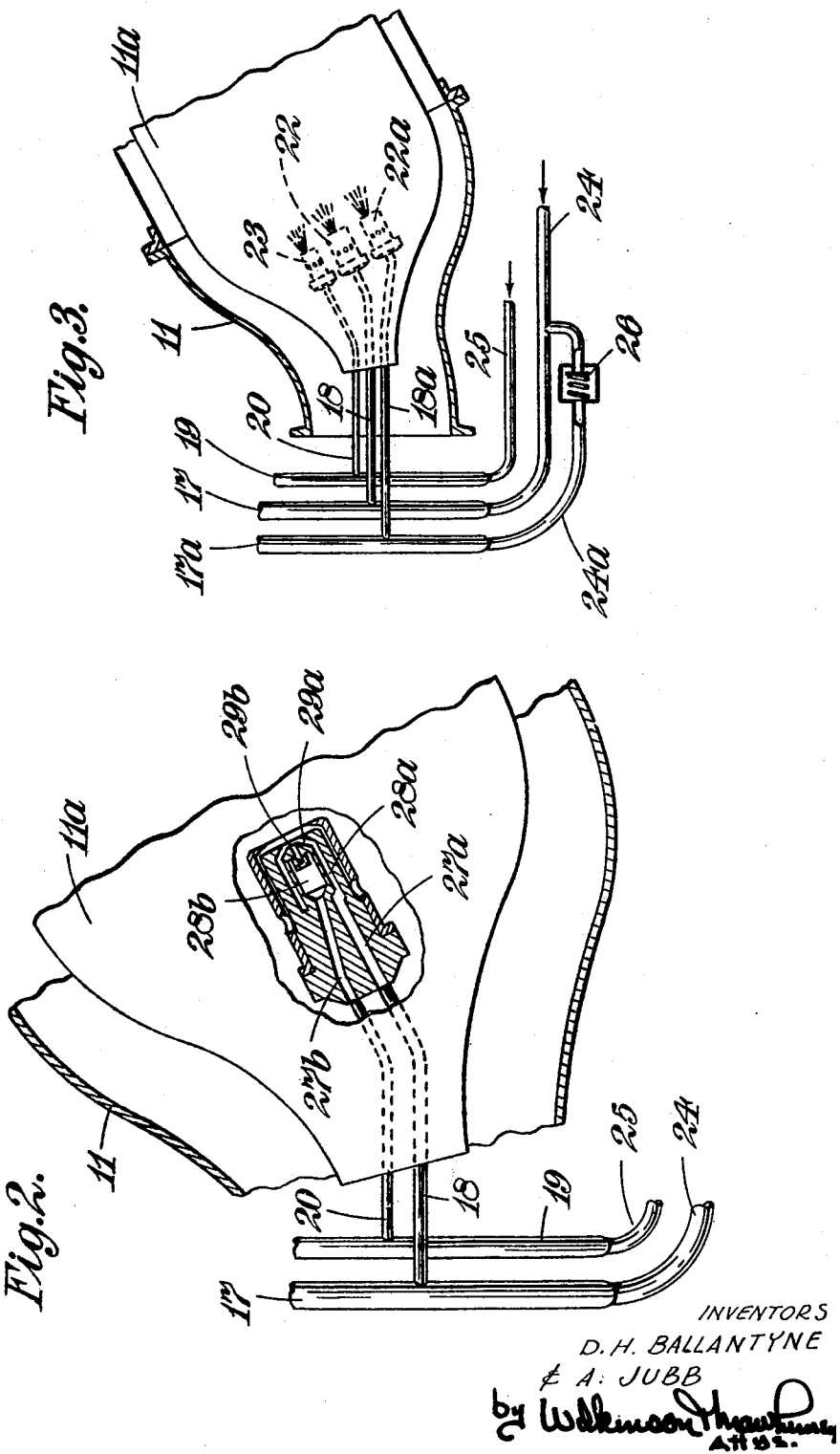

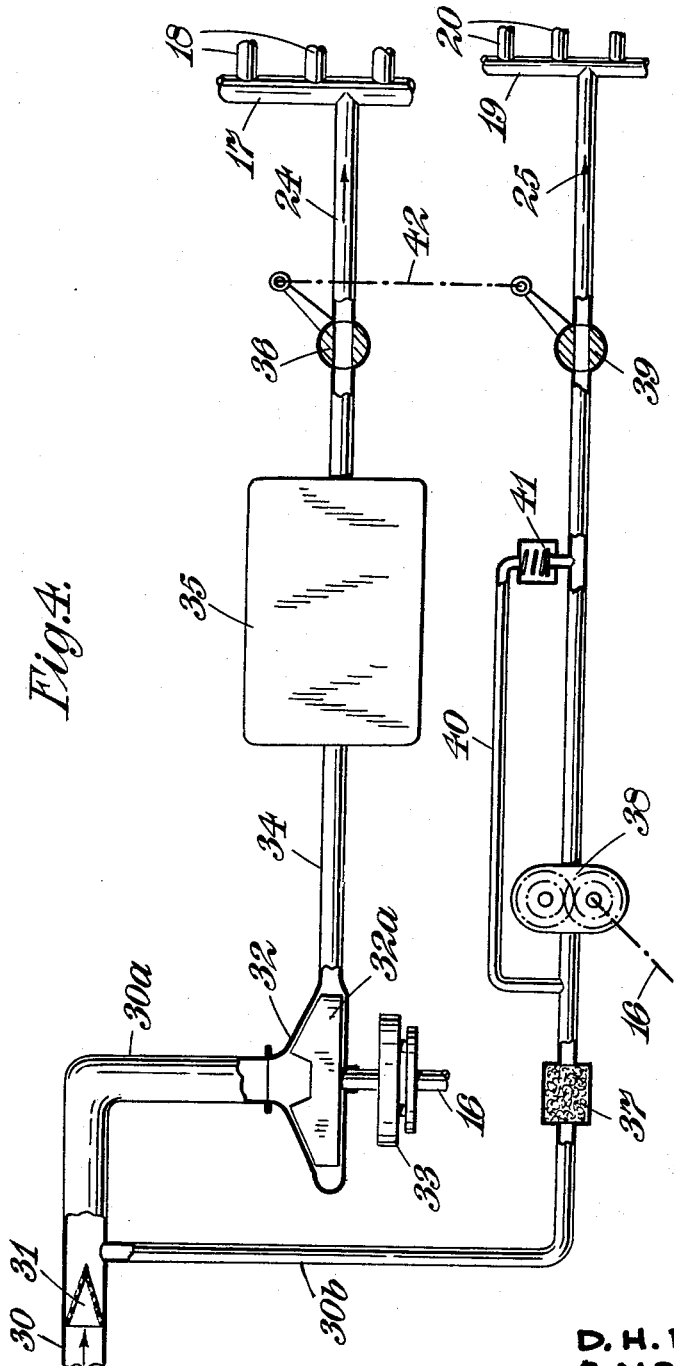

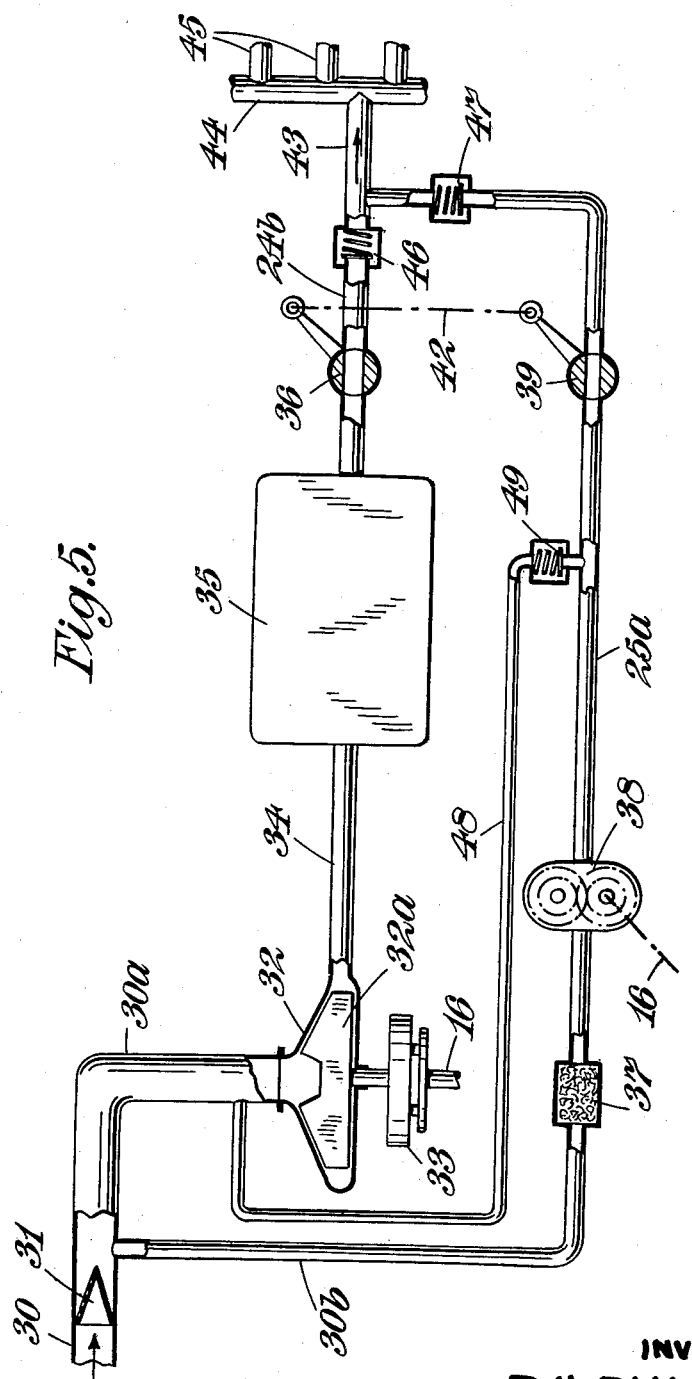

Dec. 6, 1955  D. H. BALLANTYNE ET AL  2,725,932
FUEL SYSTEM FOR GAS-TURBINE ENGINES AND THE LIKE
Filed March 6, 1950  5 Sheets-Sheet 5

INVENTORS
D. H. BALLANTYNE
ALBERT JUBB
by Wilkinson
Attys.

United States Patent Office 2,725,932
Patented Dec. 6, 1955

2,725,932

FUEL SYSTEM FOR GAS-TURBINE ENGINES AND THE LIKE

Davis Havelock Ballantyne, Littleover, and Albert Jubb, Buttershaw, Bradford, England, assignors to Rolls-Royce Limited, Derby, England, a British company Application March 6, 1950, Serial No. 147,891

Claims priority, application Great Britain November 8, 1949

22 Claims. (Cl. 158—36.4)

This invention relates to fuel systems for gas-turbine engines.

The invention is concerned with fuel systems of the kind including a liquid-fuel-pressurising pump system, burner or injector devices (hereinafter referred to as injectors) in the combustion system of the engine, and control means for varying the supply of liquid fuel from the pump system to the injectors in a desired manner.

One known fuel system of this kind includes a fuel-pressurising pump of the positive-displacement kind and of substantially constant capacity, which pump is driven by the engine, and the fuel flow to the injectors is controlled by a throttle device, excess fuel not delivered to the combustion equipment being returned to the pump inlet under control of a relief valve through a pipe leading from between the pump and throttle device; the return flow pipe is required under certain running conditions to convey fuel at a high rate of flow. In order to avoid the use of such a return flow pipe from a relief valve, another well-known fuel system of the kind referred to comprises a positive-displacement pump of adjustable volumetric capacity and a throttle or equivalent means to control the fuel flow to the injector devices, the volumetric capacity of the pump being varied to conform with the fuel requirements of the engine; in this way the use of a by-pass return pipe capable of passing fuel at high rates of flow can be avoided.

It is the primary object of the present invention to provide a fuel system having the desirable characteristics of the latter system, whilst avoiding the use of variable-capacity positive-displacement pumps, the design and construction of which involve intricate mechanisms for controlling the volumetric capacity.

According to the present invention, a fuel system for a gas-turbine engine of the kind referred to comprises a fuel-pressurising pump system including the combination with an engine-driven centrifugal pump, of a positive-displacement pump delivering fuel to the engine in parallel with the centrifugal pump.

The use of a centrifugal fuel-pressurising pump has the important advantage of simplifying the fuel system by avoiding the need for the comparatively intricate mechanism of a variable-capacity positive-displacement pump. However, a centrifugal pump has a delivery characteristic which in general makes this type of pump unsatisfactory in a gas-turbine fuel system under starting conditions and under low-power running conditions, that is when engine rotational speed, and therefore the speed at which the pump is driven, is low. To overcome this difficulty, the invention provides a positive-displacement type of pump to operate in parallel with the engine-driven centrifugal pump, the capacity of the positive-displacement pump being chosen to have appropriate delivery characteristics under low-power running conditions of the engine to meet the fuel requirements under such conditions.

The invention has an important application in fuel systems of the known kind in which the injector arrangement comprises both pilot fuel injectors and main fuel injectors. In such an arrangement, fuel for starting and low-power running of the engine is delivered to the engine through the pilot injectors, and fuel for high-power running of the engine is delivered to the engine through the main fuel injectors, the fuel delivery through pilot injectors being discontinued or not as desired. The pilot injectors are designed to have efficient atomisation or flow characteristics at low fuel flows, and the main injectors are designed to have such desirable characteristics at high fuel flows without necessitating excessively high fuel delivery pressures by the fuel pressurising pump system.

Thus according to a feature of the present invention a fuel system of the kind specified and including pilot and main fuel injectors comprises an engine-driven centrifugal pump delivering fuel to the main injectors, and an engine-driven positive-displacement pump delivering fuel to the pilot injectors.

In fuel systems in accordance with the invention the positive-displacement pump is preferably of the fixed-capacity type, and a relief valve may be provided on the delivery side of the pump to maintain a predetermined maximum fuel delivery pressure of this pump, and since the positive-displacement pump supplies only a small proportion of the maximum fuel requirements of the engine, the flow through the relief valve will be low compared with the total flow to the engine.

The positive-displacement pump may be for instance an eccentric vane type pump, a piston and cylinder type pump, or a gear type pump.

In a preferred embodiment of the invention as applied to a gas-turbine engine fuel system having main and pilot injectors, the centrifugal pump and its delivery system to the main injectors is hydraulically separate from the positive-displacement pump and its delivery system to the pilot injectors so that in effect the pumps deliver to the engine in parallel. The inlets of the centrifugal pump and the fixed-capacity pump may be connected to a common fuel suction pipe.

According to an important feature of this invention provision may be made for filtering the fuel entering the fixed capacity pump through a fine mesh filter. This has the advantage that the fixed-capacity pump, which will have relatively-moving small-clearance sealing surfaces, is protected against damage by dirt and that the relatively small orifices or nozzles of the pilot burners or injectors are protected against being clogged by dirt, whilst large pressure losses on the inlet side of the centrifugal pump due to the passage of large quantities of fuel through a fine filter, are avoided.

A coarse filter may, however, be provided for filtering the whole of the fuel supply to the engine.

The manner in which the invention may be employed in practice will now be described with reference to the accompanying drawings in which:

Figure 1 is a diagrammatic view of one form of gas-turbine engine in the fuel system of which the invention may be employed, Figure 2 is a detailed view partly in section and illustrates a modified arrangement of fuel injectors to that illustrated in Figure 1, Figure 3 is a detailed view and illustrates yet another fuel injector arrangement suitable for use with the gas-turbine engine of Figure 1, Figure 4 illustrates diagrammatically one fuel system arrangement according to this invention, Figure 5 illustrates another fuel system arrangement according to this invention, and Figure 6 illustrates a fuel system arrangement similar to Figure 4 but showing in detail a control for the main fuel supply.

In each of the figures of the drawings the same reference numerals are employed to indicate corresponding parts.

Referring to Figure 1, there is shown a typical gas-turbine engine comprising an air compressor 10, a plurality of combustion chambers 11 arranged to receive compressed air from the compressor and to have fuel burnt in them to heat the air, a turbine 13 receiving the heated gases from the combustion chambers and arranged to drive the compressor rotor 10a through a shaft 15 and an exhaust assembly 14 receiving the exhaust gases from the turbine 13. The number of combustion chambers 11, of which two only are shown, may be varied and the combustion chambers are disposed in a ring around a structural casing 12 which extends within the ring of combustion chambers 11 from the compressor 10 to the turbine 13. The turbine 13 is also arranged to drive various auxiliary equipment such as fuel and oil pumps by providing on the shaft 15 a suitable drive take-off indicated at 16.

The fuel is injected into the combustion chambers 11 by fuel injector devices and the invention is concerned with the fuel arrangement associated with the fuel injector devices of the class in which there is a main fuel supply for delivering fuel to the engine during high-power running of the engine and a pilot fuel supply for delivering fuel to the engine during starting and low-power running of the engine.

With the fuel system of this invention, the pilot fuel supply and the main fuel supply may both be fed to the combustion chambers through the same fuel injectors or alternatively they may be fed into the combustion chambers through separate fuel injectors or through fuel injectors having separate nozzles for the pilot supply and the main fuel supply.

Referring again to Figure 1, there is illustrated an arrangement in which the main and pilot fuel supplies are fed to the combustion chambers 11 through separate injectors and the main and pilot fuel injector arrangement comprises a main fuel manifold 17 arranged to be supplied with fuel through a supply pipe 24 and having a series of branch pipes 18 leading to main injectors 22, and a pilot fuel manifold 19 arranged to be supplied with fuel through a supply pipe 25 and having a series of branch pipes 20 leading to pilot injectors 23. It will be seen that in this arrangement two injectors, a pilot injector 23 and a main injector 22, are provided for each combustion chamber 11.

In the arrangement illustrated in Figure 2, the main and pilot fuel supplies are injected into the combustion chambers 11 through a single injector device having separate nozzles for the main and pilot fuel supplies. The main fuel flows from the appropriate branch pipe 18 into a supply passage 27a in the fuel injector 27 and thence from the supply passage 27a into an annular chamber 28a having an outlet in the form of a main fuel nozzle 29a. The pilot fuel flows from the branch pipe 20 into a passage 27b in the fuel injector 27 and thence into a central chamber 28b having an outlet 29b forming the injection nozzle for the pilot fuel. The fuel injector 27 may be so constructed as to impart a swirl to the fuel leaving the chambers 28a, 28b prior to its passage through the nozzles 29a and 29b.

Instead of providing a single injector having two nozzles, as illustrated in Figure 2, or providing two fuel injectors one for the pilot fuel and one for the main fuel, as illustrated in Figure 1, three fuel injectors may be provided for each combustion chamber 11 and one such arrangement is illustrated in Figure 3. In this arrangement, as in the arrangement of Figure 1, there is a pilot injector 23 supplied with fuel from the pilot manifold 19 and two main fuel injectors 22, 22a, of which the injector 22 is supplied with fuel from the main fuel manifold 17 as in the arrangement of Figure 1, and whereof the main fuel injector 22a is supplied from a manifold 17a through a branch pipe 18a, the manifold 17a being supplied with fuel through a supply pipe 24a connected with the supply pipe 24 and having arranged therein a pressurising valve 26. In such an arrangement the fuel is supplied to the combustion chamber 11 during starting and low-power running through the pilot injector 23. As the power output of the engine increases fuel is first supplied through the main injector 22 and when the fuel delivery pressure in the supply pipe 24 reaches a given value the valve 26 opens and fuel is then also supplied to the combustion chamber through the other main injector 22a.

In the arrangements illustrated in Figures 2 and 3, the combustion chambers 11 are illustrated as being provided with a flame tube or liner 11a which affords protection for the outer casing of the combustion chamber.

The present invention is concerned with fuel systems in which separate pumps are provided for pressurising the pilot and main fuel supplies and provides a fuel system in which delicate and intricate controls for the main fuel supply can be avoided.

The simplified fuel system arrangement of the invention is achieved by employing a centrifugal pump for effecting the main fuel supply and a positive-displacement pump for effecting the pilot fuel supply, the pumps being arranged to deliver in parallel to the engine.

One such pump arrangement is illustrated in Figure 4. In this arrangement there is provided a common suction pipe 30 leading from a fuel tank (not shown) and in the pipe 30 a coarse fuel filter 31. The common suction pipe 30 branches upstream of the coarse filter 31 into two branch suction pipes 30a and 30b, whereof the branch suction pipe 30a leads to the inlet eye of a centrifugal pump 32 forming the fuel pressurising pump of the main fuel supply, and whereof the branch suction pipe 30b leads to the inlet of a fixed-capacity positive-displacement pump 38 forming the fuel pressurizing pump of the pilot supply.

The centrifugal pump 32 has an impeller 32a which is driven through a suitable coupling 33 from the drive take-off 16. The centrifugal pump delivers into a pipe-line 34 leading to a main fuel supply control mechanism 35, from which the fuel flows into the main supply pipe 24 to the main fuel manifold 17.

A shut-off cock 36 is provided in the main supply pipe 24 and this shut-off cock is fully open during operation of the engine and fully closed when the engine is not running.

The pilot fuel supply from the engine-driven fixed-capacity positive-displacement pump 38, which is illustrated as a gear-type pump, and which is illustrated as being driven from the drive take-off 16, flows from the pump 38 into the pilot supply line 25 to the pilot manifold 19.

A shut-off cock 39 similar to the shut-off cock 36 is provided in the pilot fuel supply pipe 25, and the shut-off cock 39 is preferably ganged as indicated at 42 with the shut-off cock 36 for simultaneous operation.

A by-pass pipeline 40 is provided from the delivery side of the pump 38 back to its suction side and the flow through the by-pass pipe 40 is controlled by a relief valve 41, which operates to maintain a constant delivery pressure in the pilot supply line 25 so that the pressure of the pilot fuel supply is unaffected by variations in the engine running conditions.

A fine fuel filter 37 is provided in the branch suction pipe 30b to prevent particles of dirt which may pass the coarse filter 31 from entering the pilot fuel supply system and thereby clogging the pilot injectors which are connected with the branches 20 from the manifold 19. It is an advantage of the fuel system arrangement of this invention that there is no need to provide a fine filter for the fuel entering the main fuel system, since there are no low-clearance relatively-moving sealing surfaces in the main fuel pump. Thus, since the greater part of the fuel being delivered to the engine passes through the fuel system without being filtered, the pressure losses in the fuel system are substantially reduced as compared with known arrangements. Only a small proportion of the fuel flows to the engine through the branch suction pipe 30b and this fuel can pass through the fine filter 37 without introducing high pressure losses.

The use of the centrifugal pump 32 for pressurising the main fuel supply results in a much simpler fuel system than has been achieved hitherto, and the provision of the fixed-capacity positive-displacement pump 38 for pressurising the pilot fuel supply ensures that the fuel delivery at low running speeds and during starting is adequate to meet the engine requirements at these speeds.

An alternative fuel supply arrangement is illustrated in Figure 5 and this fuel arrangement is suitable for use when both the main and pilot fuel supplies are fed to the combustion chambers 11 of the engine through a common fuel injector.

In this arrangement the fuel leaving the control mechanism 35 passes into a main supply pipe 24b in which is located the shut-off cock 36 and which comprises also a non-return valve 46. The main supply pipe 24b is connected with a supply pipe 43 leading to a manifold 44 having a series of branches 45 connected each with a simple fuel injector (not shown).

In this arrangement the pilot fuel system comprises the branch suction pipe 30b in which is located filter 37, the engine-driven fixed-capacity positive-displacement pump 38 and a pilot fuel delivery pipe 25a connected with the delivery side of the pump 38 and comprising in it the shut-off cock 39 and non-return valve 47. The outlet end of the pilot fuel delivery pipe 25a is connected with the supply pipe 43 leading to the manifold 44 and to the simple fuel injectors (not shown).

A by-pass 48 extends from the pipe line 25a (between the pump 38 and cock 39) to the inlet of the main fuel pump 32, flow through the by-pass being controlled by a relief valve 49 so as to maintain a constant pressure in the pipe line 25a.

The non-return valve 46 prevents fuel delivered by the pump 38 under low speed running conditions of the engine from flowing back to the suction side of the pump through the centrifugal pump 32, and the non-return valve 47 prevents fuel delivered by the pump 32 flowing back to the inlet of pump 32 through the relief valve 49.

Referring now to Figure 6, there is illustrated a fuel system which is similar to that illustrated in Figure 4, but in which one suitable form of control for the main fuel supply is shown in detail. The control mechanism 35 may also be used with the fuel system illustrated in Figure 5.

The control mechanism 35 comprises a throttle device 50 which is movable by a control member 51 to adjust the main fuel supply to a selected value to determine the desired engine running speed, and a governor mechanism to maintain the fuel flow at such a value as to maintain the desired engine running speed selected by the throttle and to vary the fuel flow in accordance with variations in the ambient atmospheric pressure.

The governor mechanism comprises an orifice 52 located between the throttle 50 and the pump 32, the effective area of which orifice is controlled by a weir plate element 53 carried on a piston 54 working in a cylinder 55 against the action of a spring 56 under control of fluid pressures. The piston 54 is arranged to be subjected to a constant fluid pressure and for this purpose the cylinder 55 is connected with the pilot supply pipe 25 wherein the pressure is maintained constant by relief valve 41, through a branch pipe 55a leading to the upper end of the cylinder 55.

The lower end of the cylinder 55 is connected with the upper end of the cylinder 55 by a pipeline 57 comprising within it a fixed-restricting orifice 58, and a bleed pipe 59 is provided from the lower end of the cylinder 55. When there is no flow through the bleed pipe 59 the fluid pressures on each side of the piston 54 will be equal and the piston 54 will be raised under control of the spring 56, thereby lifting the weir plate 53 and increasing the area of the orifice 52 to its maximum value. When however a bleed flow occurs through the bleed pipe 59 the fluid pressure in the lower half of the cylinder 55 will be less than the fluid pressure in the upper half of the cylinder 55, and the piston 54 will take up a position in which the fluid pressure load on the upper side of the piston 54 balances the combined loads on the lower side of the piston 54 due to the fluid pressure within the lower part of the cylinder 55 and to the spring 56 thus lowering the weir plate 53 and reducing the effective area of the orifice 52. Thus, when the bleed flow through pipe 59 is decreased, the effective area of the orifice 52 is increased and the fuel delivery to the engine increases, and, when bleed is increased the effective area of the orifice 52 is decreased and the fuel delivery to the engine decreases.

The flow of bleed fluid from the bleed pipe 59 is controlled by a half ball valve element 60 carried at one end of a lever 61 which is supported on a diaphragm 62 separating two chambers 63, 64 provided within a valve body 65.

The chamber 63 is connected by a return pipeline 66 to the branch suction pipe 30a so that bleed fluid from the bleed pipe 59 flows back to the suction side of the centrifugal pump 32.

The chamber 64 is open to atmosphere and there is accommodated within it an evacuated capsule 67 having an adjustable abutment 68, the capsule 67 being arranged to bear on the lever 61 to load it. On decrease of the ambient atmospheric pressure, for example due to an increase in the altitude of an aircraft powered by a gas-turbine engine having the fuel system of this invention, the capsule 67 expands, and the load applied by it to the lever 61 in a manner tending to lift the half ball valve element 60 increases. On increase of the ambient atmospheric pressure the load afforded by the capsule 67 on the lever 61 decreases.

The lever 61 is also loaded by a spring 69 having an adjustable abutment 70, the load applied by the spring 69 tending to close the half ball valve element 60 on to the outlet from the bleed pipe 59.

The lever 61 is also arranged to be loaded by the difference in the pressures within the supply pipe 24 on each side of the throttle 50. For this purpose a branch pipe 71 is taken from the supply pipe 24 to a cylinder space 72 separated by a diaphragm 73 from a space 79 connected by pipe line 80, with the supply pipe 24 downstream of the throttle 50. The diaphragm 73 operates a tappet 74 bearing on the lever 61 so as to apply to it a load tending to lift the half valve element 60 off from its seat around the outlet from the bleed pipe 59.

It will be seen therefore that the loads applied to the lever 61 through the tappet 74 and through the capsule 67 are opposed by the load applied to the lever 61 by the spring 69, and under steady running conditions these loads will be balanced.

Under steady running conditions, any unwanted increase in the fuel supply will give rise to an increase in the pressure difference in the supply pipe 24 across the throttle 50. The load applied to the lever 61 by the tappet 74 will thus increase lifting the half ball valve 60 and permitting an increased bleed from the bleed pipe 59 and as a result the piston 54 will move to reduce the effective area of the orifice 52 cutting down the fuel supply to the engine. Any unwanted decrease in the fuel supply causes a fall in the pressure difference in the fuel pipe 24 across the throttle 50 and a reduction in the load applied to the lever 61 by the tappet 74; the half ball valve 60 will thus tend to restrict the bleed from the bleed pipe 59 and the piston will be moved to increase the effective area of the orifice 52, thus increasing the fuel supply to the engine. The decrease or increase in the fuel supply to the engine under these conditions will be such as to restore the fuel delivery to the engine to the value necessary to maintain the engine speed at the value selected by the adjustment of the throttle 50 by control member 51.

On adjustment of the control member 51 to accelerate the engine, the load applied to the lever 61 by tappet 74 will decrease thus increasing the effective area of the orifice 52 and increasing the fuel supply to the engine which increases until the loads on the lever 61 are again balanced. On adjustment of the control member 51 to decelerate the engine, the load applied to the lever 61 by tappet 74 increases thus causing the piston 54 to move to decrease the effective area of the orifice 52 and to decrease the fuel supply to the engine. The decrease in fuel supply will continue until the loads on the lever 61 are again balanced.

The capsule 67, as stated above, expands with decrease of the ambient atmospheric pressure and contracts with increase of the ambient atmospheric pressure, thereby to increase and decrease respectively the loads afforded by it on the lever 61. Thus on increase of altitude and decrease of ambient atmospheric pressure, the fuel supply to the engine is decreased, and on decrease of altitude and increase of ambient atmospheric pressure the fuel supply is increased. It is conveniently arranged that the change in the fuel supply caused by expansion and contraction of the capsule is such that for a given setting of the throttle 50 the fuel supply to the engine is always such as to maintain the constant engine rotational speed irrespective of altitude.

The construction of control mechanism 35 just described does not form an essential part of this invention and may be replaced by any other suitable control arrangement. For instance, as described in our U. S. Patent No. 2,636,553 granted April 28, 1953, the delivery flow from the fixed-capacity pump 38 may be passed through a flow-restricting means, the area of which is selectively variable and there may be provided a pressure-sensitive device connected to respond to the difference in the pressures on each side of the flow-restricting means and arranged to control the delivery of fuel to the engine by the centrifugal pump. It will be appreciated that since the fixed-capacity pump is driven at engine speed, the pressure difference is a predetermined function of engine speed, and may therefore be used as a speed sensitive signal for the control system on the centrifugal pump.

We claim:

1. In a fuel system for gas-turbine engines, the combination with fuel injection means, of a pump arrangement comprising a centrifugal pump, adapted to be driven by the engine, and a fixed-capacity positive-displacement pump adapted to be driven by the engine and having a capacity appropriate to supply substantially the engine fuel requirements at low engine rotational speeds, said pumps being connected so as to be adapted to deliver fuel to the said fuel injector means in parallel with one another.

2. In a fuel system for gas-turbine engines or the like of the class comprising pilot fuel injectors through which fuel is adapted to be delivered to the engine at least under low power running conditions and main fuel injectors through which fuel is adapted to be delivered to the engine under high power running conditions, a fuel pump arrangement comprising a centrifugal pump adapted to be driven by the engine and connected to deliver to said main fuel injectors, and a positive-displacement pump adapted to be driven by the engine and connected to said pilot fuel injectors thereby to be adapted to deliver fuel to the engine in parallel with said centrifugal pump.

3. In a fuel system for gas-turbine engines or the like of the class comprising pilot fuel injectors through which fuel is adapted to be delivered to the engine at least under low power running conditions and main fuel injectors through which fuel is adapted to be delivered to the engine under high power running conditions, a fuel pump arrangement comprising a centrifugal pump adapted to be driven by the engine and connected to deliver to said main fuel injectors, and a fixed-capacity positive-displacement pump adapted to be driven by the engine and connected to said pilot fuel injectors thereby to be adapted to deliver fuel to the engine in parallel with said centrifugal pump.

4. In a fuel system for gas-turbine engines or the like of the class comprising pilot fuel injectors through which fuel is adapted to be delivered to the engine at least under low power running conditions and main fuel injectors through which fuel is adapted to be delivered to the engine under high power running conditions, a fuel pump arrangement comprising a centrifugal pump adapted to be driven by the engine and connected to deliver to said main fuel injectors, and a fixed-capacity positive-displacement pump adapted to be driven by the engine and having a delivery characteristic appropriate to supply the engine fuel requirements at low engine rotational speeds and connected to said pilot fuel injectors thereby to be adapted to deliver fuel to the engine in parallel with said centrifugal pump.

5. In a fuel system for gas-turbine engines or the like of the class comprising pilot fuel injectors through which fuel is adapted to be delivered to the engine at least under low power running conditions and main fuel injectors through which fuel is adapted to be delivered to the engine under high power running conditions, a fuel pump arrangement comprising a centrifugal pump adapted to be driven by the engine and connected to deliver to said main fuel injectors, a fixed-capacity positive-displacement pump adapted to be driven by the engine and connected to said pilot fuel injectors thereby to be adapted to deliver fuel to the engine in parallel with said centrifugal pump, a common suction pipe, and branch pipes from said common suction pipe leading respectively to the inlet of the centrifugal pump and the inlet of the fixed-capacity positive-displacement pump.

6. In a fuel system for gas-turbine engines or the like of the class comprising pilot fuel injectors through which fuel is adapted to be delivered to the engine at least under low power running conditions and main fuel injectors through which fuel is adapted to be delivered to the engine under high power running conditions, a fuel pump arrangement comprising a centrifugal pump adapted to be driven by the engine and connected to deliver to said main fuel injectors, a fixed-capacity positive-displacement pump adapted to be driven by the engine and connected to said pilot fuel injectors thereby to be adapted to deliver fuel to the engine in parallel with said centrifugal pump, a common suction pipe, branch pipes from said common suction pipe leading respectively to the inlet of the centrifugal pump and the inlet of the fixed-capacity positive-displacement pump, and a fine fuel filter in the branch pipe leading from the common suction pipe to the fixed-capacity positive-displacement pump.

7. In a fuel system for gas-turbine engines or the like of the class comprising pilot fuel injectors through which fuel is adapted to be delivered to the engine at least under low power running conditions and main fuel injectors through which fuel is adapted to be delivered to the engine under high power running conditions, a fuel pump arrangement comprising a centrifugal pump adapted to be driven by the engine and connected to deliver to said main fuel injectors, a fixed-capacity positive-displacement pump adapted to be driven by the engine and connected to said pilot fuel injectors thereby to be adapted to deliver fuel to the engine in parallel with said centrifugal pump, a common suction pipe, branch pipes from said common suction pipe leading respectively to the inlet of the centrifugal pump and the inlet of the fixed-capacity positive-displacement pump, a fine filter in the branch pipe leading from the common suction pipe to the fixed-capacity positive-displacement pump and a coarse fuel filter in the common suction pipe.

8. In a fuel system for gas-turbine engines or the like of the class comprising fuel injectors, the combination with said fuel injectors of a main and pilot fuel supply arrangement comprising a centrifugal pump adapted to be driven by the engine, a conduit connecting the delivery of said centrifugal pump with the fuel injectors, a non-return valve in said conduit, a positive-displacement pump adapted to be driven by the engine, and a second conduit connected at one end with the delivery of said positive-displacement pump and at the other end with first said conduit downstream of said non-return valve.

9. In a fuel system for gas-turbine engines or the like of the class comprising fuel injectors, the combination with said fuel injectors of a main and pilot fuel supply arrangement comprising a centrifugal pump adapted to be driven by the engine, a conduit connecting the delivery of said centrifugal pump with the fuel injectors, a non-return valve in said conduit, a fixed-capacity positive-displacement pump, and a second conduit connected at one end with the delivery of said fixed-capacity positive displacement pump and at the other end with first said conduit downstream of said non-return valve.

10. In a fuel system for gas-turbine engines or the like of the class comprising fuel injectors, the combination with said fuel injectors of a main and pilot fuel supply arrangement comprising a centrifugal pump adapted to be driven by the engine, a conduit connecting the delivery of said centrifugal pump with the fuel injectors, a non-return valve in said conduit, a fixed-capacity positive-displacement pump adapted to be driven by the engine and having delivery characteristics appropriate to supply the engine fuel requirements at low engine rotational speeds, and a second conduit connected at one end with the delivery of said fixed-capacity positive-displacement pump and at the other end with first said conduit downstream of said non-return valve.

11. In a fuel system for gas-turbine engines or the like of the class comprising fuel injectors adapted to deliver fuel to the engine under all running conditions of the engine, the combination with said fuel injectors of a main and pilot fuel supply system comprising a suction conduit, a first branch conduit from said suction conduit, a centrifugal pump adapted to be driven by the engine and having its inlet connected with said first branch conduit, a first delivery conduit connected at one end with the delivery of said centrifugal pump and connected at its opposite end with said fuel injectors, a non-return valve in said first delivery conduit to permit fuel to flow from said centrifugal pump to said fuel injectors, a second branch conduit from said suction conduit, a positive-displacement pump adapted to be driven by the engine and having its inlet connected with said second branch conduit, and a second delivery conduit connected at one end with the delivery of said positive-displacement pump and at its opposite end with the said first delivery conduit downstream of said non-return valve.

12. In a fuel system for gas-turbine engines or the like of the class comprising fuel injectors adapted to deliver fuel to the engine under all running conditions of the engine, the combination with said fuel injectors of a main and pilot fuel supply system comprising a suction conduit, a first branch conduit from said suction conduit, a centrifugal pump adapted to be driven by the engine and having its inlet connected with said first branch conduit, a first delivery conduit connected at one end with the delivery of said centrifugal pump and connected at its opposite end with said fuel injectors, a non-return valve in said first delivery conduit to permit fuel to flow from said centrifugal pump to said fuel injectors, a second branch conduit from said suction conduit, a fixed-capacity positive-displacement pump adapted to be driven by the engine and having its inlet connected with said second branch conduit, and a second delivery conduit connected at one end with the delivery of said fixed-capacity positive-displacement pump and at its opposite end with said first delivery conduit downstream of said non-return valve.

13. In a fuel system for gas-turbine engines or the like of the class comprising fuel injectors adapted to deliver fuel to the engine under all running conditions of the engine, the combination with said fuel injectors of a main and pilot fuel supply system comprising a suction conduit, a first branch conduit from said suction conduit, a centrifugal pump adapted to be driven by the engine and having its inlet connected with said first branch conduit, a first delivery conduit connected at one end with the delivery of said centrifugal pump and connected at its opposite end with said fuel injectors, a non-return valve in said first delivery conduit to permit fuel to flow from said centrifugal pump to said fuel injectors, a second branch conduit from said suction conduit, a fine fuel filter in said second branch conduit, a fixed-capacity positive-displacement pump adapted to be driven by the engine and having its inlet connected with said second branch conduit, and a second delivery conduit connected at one end with the delivery of said fixed-capacity positive-displacement pump and at its opposite end with said first delivery conduit downstream of said non-return valve.

14. In a fuel system for gas-turbine engines or the like of the class comprising fuel injectors adapted to deliver fuel to the engine under all running conditions of the engine, the combination with said fuel injectors of a main and pilot fuel supply system comprising a suction conduit, a coarse fuel filter in said suction conduit, a first branch conduit from said suction conduit, a centrifugal pump adapted to be driven by the engine and having its inlet connected with said first branch conduit, a first delivery conduit connected at one end with the delivery of said centrifugal pump and connected at its opposite end with said fuel injectors, a non-return valve in said first delivery conduit to permit fuel to flow from said centrifugal pump to said fuel injectors, a second branch conduit from said suction conduit, a fine fuel filter in said second branch conduit, a fixed-capacity positive-displacement pump adapted to be driven by the engine and having its inlet connected with said second branch conduit, and a second delivery conduit connected at one end with the delivery of said fixed-capacity positive-displacement pump and at its opposite end with said first delivery conduit downstream of said non-return valve.

15. In a fuel system for gas-turbine engines or the like of the class comprising a main fuel supply and a pilot fuel supply, the combination comprising a suction conduit, a first branch conduit from said suction conduit, a centrifugal pump adapted to be driven by the engine and having its inlet connected with said first branch conduit and adapted to be connected to deliver fuel to the engine at least during high power running of the engine, a second branch conduit from said suction conduit, and a fixed-capacity positive-displacement pump adapted to be driven by the engine and having delivery characteristics appropriate to supply the engine fuel requirements at low engine rotational speeds, having its inlet connected with said second branch conduit and adapted to be connected to deliver fuel to the engine at least at low engine rotational speeds.

16. In a fuel system for gas-turbine engines or the like of the class comprising a main fuel supply and a pilot fuel supply, the combination comprising a suction conduit, a first branch conduit from said suction conduit, a centrifugal pump adapted to be driven by the engine and having its inlet connected with said first branch conduit and adapted to be connected to deliver fuel to the engine at least during high power running of the engine, a second branch conduit from said suction conduit, a fine fuel filter in said second branch conduit, a fixed-capacity positive-displacement pump adapted to be driven by the engine and having delivery characteristics appropriate to supply the engine fuel requirements at low engine rotational speeds and having its inlet connected with said second branch conduit and adapted to be connected to deliver fuel to the engine at least at low engine rotational speeds.

17. In a fuel system for gas-turbine engines or the like of the class comprising a main fuel supply and a pilot fuel supply, the combination comprising a suction conduit, a first branch conduit from said suction conduit, a coarse fuel filter in said suction conduit, a centrifugal pump adapted to be driven by the engine and having its inlet connected with said first branch conduit and adapted to be connected to deliver fuel to the engine at least during high power running of the engine, a second branch conduit from said suction conduit, a fine fuel filter in said second branch conduit, a fixed-capacity positive-displacement pump adapted to be driven by the engine and having delivery characteristics appropriate to supply the engine fuel requirements at low engine rotational speeds and having its inlet connected with said second branch conduit and adapted to be connected to deliver fuel to the engine at least at low engine rotational speeds.

18. In a fuel system for gas-turbine engines or the like of the class comprising pilot fuel injectors through which fuel is adapted to be delivered to the engine at least under low power running conditions and main fuel injectors through which fuel is adapted to be delivered to the engine under high power running conditions, a fuel pump arrangement comprising a centrifugal pump adapted to be driven by the engine connected to deliver to said main fuel injectors at least under the high power running conditions of the engine, and an auxiliary positive-displacement pump adapted to be driven by the engine and connected to said pilot fuel injectors thereby being adapted to continuously deliver fuel to the engine in parallel with said centrifugal pump at least under the low power running conditions of the engine.

19. In a fuel system for gas-turbine engines or the like of the class comprising pilot fuel injectors through which fuel is adapted to be delivered to the engine at least under low power running conditions and main fuel injector through which fuel is adapted to be delivered to the engine under high power running conditions, a fuel pump arrangement comprising a centrifugal pump connected to deliver to said main fuel injectors, and a fixed-capacity positive-displacement pump having a delivery characteristic appropriate to supply the engine fuel requirements at low engine rotational speeds and connected to said pilot fuel injectors thereby to be adapted to deliver fuel to the engine in parallel with said centrifugal pump.

20. In a fuel system for gas-turbine engines or the like of the class comprising fuel injectors, the combination with said fuel injectors of a main and pilot fuel supply arrangement comprising a centrifugal pump, a conduit connecting the delivery of said centrifugal pump with the fuel injectors, a non-return valve in said conduit, a fixed-capacity positive-displacement pump having delivery characteristics appropriate to supply the engine fuel requirements at low engine rotational speeds, and a second conduit connected at one end with the delivery of said fixed-capacity positive-displacement pump and at the other end with first said conduit downstream of said non-return valve.

21. In a fuel system of a gas-turbine engine of the class comprising fuel injectors, the combination with said fuel injectors of a main and pilot fuel supply arrangement comprising a centrifugal pump, a conduit connecting the delivery of the centrifugal pump with some at least of the fuel injectors, a fixed-capacity positive-displacement pump having delivery characteristics appropriate to supply substantially the engine fuel requirements at low engine rotational speeds, a second conduit connecting the delivery of the positive-displacement pump with some at least of the fuel injectors, and driving connections from each of said pumps to the engine to be driven continuously during operation of the engine.

22. A fuel system for gas-turbine engines including the combination with fuel injector means, of a pump arrangement comprising a centrifugal pump adapted to be driven through operation of the engine and connected to deliver to said fuel injector means, and a fixed-capacity positive-displacement pump adapted to be driven by the engine and having a capacity appropriate to supply substantially the engine fuel requirements at low engine rotational speeds and connected so as to be adapted to deliver fuel to said fuel injector means in parallel with the centrifugal pump.

References Cited in the file of this patent

UNITED STATES PATENTS

| | | |
|---|---|---|
| 1,653,167 | Graham et al. | Dec. 20, 1927 |
| 2,374,844 | Stokes | May 1, 1945 |
| 2,401,883 | Pugh et al. | June 11, 1946 |
| 2,407,973 | Beckstrom | Sept. 24, 1946 |
| 2,469,678 | Wyman | May 10, 1949 |

FOREIGN PATENTS

| | | |
|---|---|---|
| 920,910 | France | Jan. 8, 1947 |
| 592,769 | Great Britain | Sept. 29, 1947 |